United States Patent [19]
Frouin et al.

[11] Patent Number: 6,136,867
[45] Date of Patent: *Oct. 24, 2000

[54] AQUEOUS SUSPENSION OF SILICA AND OF ALUMINIUM SULPHATE OR OF ALUM, PROCESSES FOR THE PREPARATION AND USES OF THE SAID SUSPENSION

[75] Inventors: Laurent Frouin, L'Hay les Roses; Evelyne Prat, Pantin, both of France

[73] Assignee: Rhone-Poulenc Chimie, Courbevoie Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 08/627,035

[22] Filed: Apr. 3, 1996

[30] Foreign Application Priority Data

Apr. 3, 1995 [FR] France .................................. 95 03901

[51] Int. Cl.$^7$ .................................................. C01B 33/113
[52] U.S. Cl. ........................ 516/80; 516/100; 106/287.1; 106/287.17; 106/287.34; 162/181.6
[58] Field of Search .............................. 252/313.2, 315.5, 252/315.6, 313.1; 106/287.1, 287.17, 287.34, 737, 788; 516/80, 100; 162/181.6

[56] References Cited

U.S. PATENT DOCUMENTS

| | | | |
|---|---|---|---|
| 2,892,797 | 6/1959 | Alexander et al. | 252/313.2 |
| 3,007,878 | 11/1961 | Alexander et al. | 252/313.2 |
| 3,291,626 | 12/1966 | Shurling et al. | 106/737 |
| 3,709,823 | 1/1973 | Sugahara et al. | 252/313.2 |
| 4,359,339 | 11/1982 | Van Fisk, Jr. | 106/38.3 |
| 4,537,699 | 8/1985 | Jas | 252/313.2 |
| 5,028,263 | 7/1991 | Burdick | 106/162.8 |
| 5,342,598 | 8/1994 | Persello | 423/339 |
| 5,403,570 | 4/1995 | Chevallier et al. | 423/339 |
| 5,418,273 | 5/1995 | Dromard et al. | 524/437 |
| 5,482,693 | 1/1996 | Rushmere et al. | 423/328.1 |
| 5,895,688 | 4/1999 | Bertoncini et al. | 427/427 |

FOREIGN PATENT DOCUMENTS

| | | |
|---|---|---|
| 0110762 | 6/1984 | European Pat. Off. |
| 0329509 | 8/1989 | European Pat. Off. |
| 0407262 | 1/1991 | European Pat. Off. |
| 0520862 | 12/1992 | European Pat. Off. |

OTHER PUBLICATIONS

Hawley's Condensed Chemical Dictionary, Eleventh Edition (Van Nostrand Reinhold Co., NY, NY 1987 (c)) pp. 406, 1008, 1152,. Oct. 1989.

Chemical Abstracts, vol. 112, No. 18, Apr. 30, 1990, Columbus, Ohio; Abstract No. 161657r, Kuprienko et al.

*Primary Examiner*—Richard D. Lovering
*Assistant Examiner*—Daniel S. Metzmaier
*Attorney, Agent, or Firm*—Burns, Doane, Swecker & Mathis, L.L.P.

[57] ABSTRACT

The invention relates to aqueous suspensions of precipitated silica and of aluminum sulphate which have a pH lower than 4 and a solids content of between 10 and 50% by weight and which, after a period at rest of 48 hours, are in the form of a gel. The gel is reversible under low shear. The invention also relates to processes for the preparation of these suspensions and to their uses, especially in the field of cement mixes, mortars and concretes.

19 Claims, No Drawings

AQUEOUS SUSPENSION OF SILICA AND OF ALUMINIUM SULPHATE OR OF ALUM, PROCESSES FOR THE PREPARATION AND USES OF THE SAID SUSPENSION

The present invention relates to a new aqueous suspension of silica, especially of precipitated silica, and of aluminium compound, in particular of aluminium sulphate, and to processes for its preparation.

It also relates to its uses, in particular in the field of cement mixes based on cement and water, and of mortars and concretes.

Aqueous suspensions of silica are employed in very varied fields and especially in the paper and concrete industries.

For these various applications, in particular in the field of concrete, it is advantageous to have available suspensions which have a high solids content. However, such suspensions generally have excessively high viscosities and this results especially in pumping difficulties and hence reduces the possibilities of industrial use.

In addition, these suspensions, in particular those of silica of large particle size, tend to sediment or settle during storage. The formation of a hard layer above which there is a fluid slurry which is depleted in solids content is, in fact, observed very frequently after a storage period of a few days. In most cases it is then impossible to resuspend the silica or to obtain a slurry which is homogeneous and of sufficiently low viscosity to be easily pumpable and hence usable industrially.

The objective of the present invention is especially to propose new aqueous suspensions containing silica, which do not exhibit the abovementioned disadvantages.

Thus, the main subject-matter of the present invention consists of aqueous suspensions (or slurries) containing a silica, preferably a precipitated silica, which have a tendency to form a gel when they are left at rest, and this prevents the sedimentation or settling of the product during storage, thus ensuring the stability of the suspension over several weeks or even several months, which suspension substantially retains its homogeneity over such a period. In addition, the gel formed is completely reversible under a weak stress: under low shear or agitation it is thus converted into a homogeneous suspension, of low viscosity and hence easily pumpable.

The suspension according to the invention is an aqueous suspension of silica and of aluminium compound chosen from aluminium sulphate, basic aluminium sulphates, alums and their mixtures, characterized in that it has a pH lower than 4 and a solids content of between 10 and 50% by weight, and in that, after having been left at rest for 48 hours, it is in the form of a gel, the said gel being reversible under low shear.

The solids content of the suspension according to the invention is between 10 and 50% by weight, preferably between 15 and 45% by weight. It is, for example, between 20 and 40% by weight.

The suspension according to the invention has a pH (measured according to ISO standard 787/9 (pH of a 5% suspension in water)) lower than 4, preferably lower than 3.5 and, for example, lower than 3. In addition, this pH is generally at least 2, in particular at least 2.2.

The said suspension advantageously has a silica content (expressed as anhydrous silica) of between 1 and 49% by weight, preferably between 3 and 35% by weight. This content may be between 5 and 30% by weight, in particular between 8 and 20% by weight.

It has advantageously an aluminium compound content (expressed as anhydrous aluminium compound) of between 1 and 49% by weight, preferably between 3 and 40% by weight. This content may be between 5 and 35% by weight, in particular between 10 and 30% by weight.

According to an alternative form of the invention the said aqueous suspension has a silica content of between 11 and 20% by weight and/or an aluminium compound content (expressed as anhydrous aluminium compound) of between 21 and 30% by weight.

The aluminium compound present in the suspension according to the invention is chosen from aluminium sulphate, alums and their mixtures.

Alums are intended to mean compounds of aluminium sulphate with alkali metal sulphates, of general formula $MAl(SO_4)_2 \cdot 12H_2O$ (with M=Li, Na or K, for example). The ammonium radical or monovalent thallium can also form alums with aluminium sulphate.

The aluminium compound is advantageously an aluminium sulphate.

The said aluminium sulphate may originate from an anhydrous aluminium sulphate ($Al_2(SO_4)_3$) or from a hydrated aluminium sulphate (especially of formula $Al_2(SO_4)_3 \cdot 14H_2O$ or $Al_2(SO_4)_3 \cdot 18H_2O$).

It may be a basic aluminium sulphate chosen, for example, from those of formula:

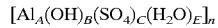

$$[Al_A(OH)_B(SO_4)_C(H_2O)_E]_n$$

with:
n a positive integer,
A equal to 1,
B between 0.75 and 2,
C between 0.5 and 1.12,
E is between 1.5 and 4 when the sulphate is solid and E is greater than 4 when the sulphate is in the form of an aqueous solution, and
B+2C=3. These may be, for example, the basic aluminium sulphates described in U.S. Pat. No. 4,877,597.

It may also be a basic aluminium sulphate chosen, for example, from those of formula:

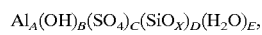

$$Al_A(OH)_B(SO_4)_C(SiO_X)_D(H_2O)_E,$$

with:
A equal to 1,
B between 0.75 and 2,
C between 0.3 and 1.12,
D between 0.005 and 0.1,
$2<X\leq 4$
E is between 1.5 and 4 when the sulphate is solid and E is greater than 4 when the sulphate is in the form of an aqueous solution, and
$3=B+2C+2D(X-2)$. These may be, for example, the basic aluminium sulphates described in U.S. Pat. No. 4,981,675.

While the silica present in the suspension according to the invention may be chosen especially from silica smokes, precipitated silicas, silica compounds including predominantly silica which are chosen from silicoaluminates, for example Tixosil 28 marketed by Rhône-Poulenc, smectites or smectite-type magnesium silicates and their mixtures, at least one precipitated silica is preferably employed as silica.

Precipitated silica is here intended to mean a silica obtained by precipitation from the reaction of an alkali metal silicate with an acid, generally inorganic, at a suitable pH of the precipitation medium, in particular a basic, neutral or weakly acidic pH; the silica may be prepared by any method (addition of acid to a base stock of silicate, total or partial simultaneous addition of acid or of silicate to a base stock of water or of silicate solution, and the like) and the method is chosen as a function of the silica type which it is desired to obtain; at the end of the precipitation stage a stage of separation of the silica from the reaction mixture is generally undertaken by any known means, for example filter press or vacuum filter; a filter cake is thus collected, which is washed if necessary; this cake, optionally after disintegrating, may be dried by any known means, especially by atomizing, and then optionally ground and/or agglomerated.

In the description which follows, the BET specific surface is determined according to the Brunauer-Emmett-Teller method, described in the "Journal of the American Chemical Society", Vol. 60, page 309, February 1938 and corresponding to NFT standard 45007 (November 1987).

The CTAB specific surface is the outer surface determined according to NFT standard 45007 (November 1987) (5.12).

Finally, it is specified that the pore volumes given are measured by mercury porosimetry, the pore diameters being calculated using the Washburn relationship with an angle of contact theta equal to 130° and a surface tension gamma equal to 484 dynes/cm (Micromeritics 9300 porosimeter).

The preferred dispersibility and disintegratability of the silicas that can be employed in the suspensions according to the invention can be quantified by means of a specific disintegration test.

The disintegration test is carried out according to the following procedure:

the cohesion of the agglomerates is assessed by a particle size measurement (using laser scattering), performed on a suspension of silica disintegrated beforehand by the application of ultrasonics; the disintegratability of the silica (rupture of the objects from 0.1 to a few tens of microns) is thus measured. The disintegration with ultrasound is performed with the aid of a Vibracell Bioblock (600 W) sonic transducer equipped with a probe 19 mm in diameter. The particle size measurement is performed using laser scattering, in a Sympatec particle size analyser.

2 grams of silica are weighed into a sample tube (height: 6 mm and diameter: 4 cm) and are made up to 50 grams by addition of demineralized water; an aqueous suspension containing 4% of silica is thus produced, which is homogenized for 2 minutes by magnetic stirring. The disintegration with ultrasound is then performed as follows: with the probe immersed over a depth of 4 cm, the output power is adjusted so as to obtain a power dial needle deflection indicating 20% (which corresponds to an energy of 120 watts/cm$^2$ dissipated by the end of the probe). The disintegration is performed for 420 seconds. The particle size measurement is then carried out after a known volume (expressed in ml) of the homogenized suspension has been introduced into the cell of the particle size analyser.

The value of the median diameter $\phi_{50}$ which is obtained is proportionately smaller the greater the disintegratability exhibited by the silica. The ratio (10×volume of suspension introduced (in ml))/optical density of the suspension detected by the particle size analyser is also determined (this optical density is of the order of 20). This ratio indicates the fines content, that is to say the content of particles smaller than 0.1 µm which are not detected by the particle size analyser. This ratio, called an ultrasonic disintegration factor ($F_D$) is proportionately higher the greater the disintegratability exhibited by the silica.

The precipitated silica preferably present in the suspension according to the invention generally exhibits a CTAB specific surface of between 50 and 250 m$^2$/g, in particular between 100 and 240 m$^2$/g.

The suspension according to the invention advantageously contains a precipitated silica which has a very good dispersibility and disintegratability.

It is thus possible to employ a precipitated silica as described in European Patent Application EP 0520862. In particular, this precipitated silica ($S_1$) may be preferably in the form of substantially spherical beads which have a BET specific surface of between 140 and 200 m$^2$/g, a CTAB specific surface of between 140 and 200 m$^2$/g, a pore distribution such that the pore volume consisting of the pores whose diameter is between 175 and 275 Å represents at least 50%, for example at least 60%, of the pore volume consisting of the pores of diameters smaller than or equal to 400 Å (and, preferably, a mean size of at least 80 µm, for example of at least 100 µm). These beads may have an ultrasonic disintegration factor ($F_D$) higher than 5.5 ml and a median diameter ($\phi_{50}$), after disintegration with ultrasound, smaller than 5 µm.

A precipitated silica which is generally in the form of powder, of granules or of substantially spherical beads and is chosen from the following, may also be employed as silica which has an excellent dispersibility and disintegratability:

a precipitated silica ($S_2$) possessing:
　a CTAB specific surface of between 140 and 240 m$^2$/g,
　an ultrasonic disintegration factor ($F_D$) higher than 11 ml, for example higher than 12.5 ml,
　a median diameter ($\phi_{50}$), after disintegration with ultrasound, smaller than 2.5 µm, in particular smaller than 2.4 µm, for example smaller than 2.0 µm;

a precipitated silica ($S_3$) possessing:
　a CTAB specific surface of between 140 and 240 m$^2$/g,
　a pore distribution such that the pore volume consisting of the pores whose diameter is between 175 and 275 Å represents less than 50%, for example less than 40%, of the pore volume consisting of pores of diameters smaller than or equal to 400 Å,
　an ultrasonic disintegration factor ($F_D$) higher than 5.5 ml,
　a median diameter ($\phi_{50}$), after disintegration with ultrasound, smaller than 5 µm;

a precipitated silica ($S_4$) possessing:
　a CTAB specific surface of between 100 and 140 m$^2$/g,
　a median diameter ($\phi_{50}$), after disintegration with ultrasound, smaller than 2.8 µm, in particular smaller than 2.7 µm, for example smaller than 2.5 µm,
　in general, an ultrasonic disintegration factor ($F_D$) higher than 3.0 ml;

a precipitated silica ($S_5$) possessing:
　a CTAB specific surface of between 100 and 140 m$^2$/g,
　a pore distribution such that the pore volume consisting of the pores whose diameter is between 175 and 275 Å represents less than 55%, in particular less than 50%, for example less than 40%, of the pore volume consisting of pores of diameters smaller than or equal to 400 Å,
　a median diameter ($\phi_{50}$), after disintegration with ultrasound, which is smaller than 4.5 µm, in particular smaller than 4 µm, for example smaller than 3.8 µm,
　in general, an ultrasonic disintegration factor ($F_D$) higher than 3.0 ml.

The silica, in particular the precipitated silica, present in the suspension according to the invention may be finely divided, especially as a result of grinding (for example wet grinding) or of disintegration with ultrasound.

Nevertheless, the use of the aluminium compound, in particular of aluminium sulphate, makes it also possible to stabilize suspensions of silica which is not finely divided and which has, on the contrary, a large particle size, in particular such that $d_{10}$ is between 4 and 10 μm, $d_{50}$ is between 15 and 30 μm and $d_{90}$ is between 50 and 100 μm. The quantity $d_{10}$ denotes the particle diameter such that 10% of the population of the silica particles have a smaller diameter; similarly, $d_{50}$ (or $d_{90}$) denotes the particle diameter such that 50% (or 90%) of the population of the silica particles have a smaller diameter. These particle size measurements are preferably performed by laser scattering on a Cilas particle size analyser. It should be noted that, without use of the aluminium compound additive, such silica suspensions settle after less than one week's storage and result in the formation of a deposit which cannot be easily redispersed, in particular under mechanical agitation.

An essential characteristic of the suspension according to the invention is its ability to form a gel after it has been left at rest; this prevents the phenomena of sedimentation or settling during storage, thus ensuring the stability of the suspension over a number of weeks or even a number of months (especially at least three months); the suspension substantially retains its homogeneity over such a period.

Thus, according to the present invention, after a period at rest of 48 hours, preferably already after a period at rest of 24 hours, or even after a period at rest of only 2 hours, the suspension is in the form of a gel, this gel being reversible under low shear.

Thus, after a period at rest of 24 hours, the solution is preferably in the form of a gel which has a viscosity ($V_1$), measured under a shear of 1 $S^{-1}$ for 1 minute, higher than 0.6 Pa s, preferably higher than 1.5 Pa s, in particular higher than 2.0 Pa s (and in general lower than 25 Pa s).

The procedure for making explicit the gel nature of the suspension according to the invention after a period at rest is the following.

The gel is introduced into an MS 125 or MS 145 measurement cell of a Contraves Rheomat Z115 rheometer; shearing at 500 $S^{-1}$ is performed for 1 minute in order to destructure the gel; the gel is then allowed to reform for 24 hours, care being taken to cover the cell with a leakproof plastic film in order to prevent possible dehydration of the gel; at the end of these 24 hours the following operations can be carried out:

a viscosity measurement ($V_1$) is performed by applying a shear of 1 $S^{-1}$ for 1 minute; the measured value is proportionately higher the greater the tendency of the suspension to gel;

another viscosity measurement ($V_2$) can be performed next by applying a shear of 50 $s^{-1}$ for 1 minute; the measured value is proportionately lower the more fragile the gel; in general, the suspensions according to the invention have a viscosity $V_2$ of between 0.05 and 0.4 Pa s;

finally, another viscosity measurement ($V_3$) can be performed by applying a shear of 500 $s^{-1}$ for 1 minute; the measured value is proportionately lower the greater the pumpability of the suspension; in general, the suspensions according to the invention have a viscosity $V_3$ of between 0.03 and 0.35 Pa s.

The gel in the form of which the suspension according to the invention is after a period at rest of 48 hours (preferably already after a period at rest of 24 hours or even after a period at rest of only 2 hours) is reversible under low stress: under low shear it is thus converted into a homogeneous suspension of low viscosity, and therefore easily pumpable; more particularly, the said gel is such that shearing at 500 $s^{-1}$ for 1 minute converts it into a suspension which has a viscosity ($V_r$), measured under a shear of 50 $s^{-1}$ minute, of at most 0.35 Pa s, preferably at most 0.30 Pa s, for example at most 0.25 Pa s.

The procedure for determining this viscosity ($V_r$) is the following:

The gel is introduced into an MS 125 or MS 145 measurement cell of a Contraves Rheomat Z115; shearing at 500 $s^{-1}$ is performed for 1 minute in order to destructure the gel; a viscosity measurement ($V_r$) of the product obtained is then performed by applying a shear of 50 $s^{-1}$ for 1 minute.

It should be noted that the characteristics of the suspensions according to the invention are obtained without the use of surface-active agents, regardless of whether they are anionic, cationic, amphoteric or nonionic. Thus, preferably but not necessarily, the suspensions according to the invention do not contain any surface-active agents.

Another subject-matter of the present invention is processes for the preparation of the suspensions described above.

The suspension according to the invention can be prepared optionally by a process including the mixing, with agitation (especially mechanical agitation) of an aqueous solution of the aluminium compound, in particular of aluminium sulphate, with a silica compound including predominantly silica and preferably with a precipitated silica as described above, which is in the form of powder, of granules or of substantially spherical beads, especially a precipitated silica $S_1$ to $S_5$.

The suspension according to the invention can also be prepared by a process including the mixing, with agitation, of an aqueous suspension of silica with the said aluminium compound, in powder form and, optionally of water. Any kind of aqueous silica suspension may be employed, such as an aqueous suspension of precipitated silica, a colloidal silica suspension commonly called a silica sol, it being possible for the latter to be obtained, for example, by filtration of sodium silicate on an ion exchange resin or an aqueous suspension of a silica compound including predominantly silica, as defined above.

In particular, this process includes the addition, with mechanical agitation, of aluminium sulphate, for example anhydrous or preferably hydrated, in powder form and, optionally, of water, to an aqueous suspension of precipitated silica, and then continuation of the agitation of the mixture thus obtained.

Finally, the suspension according to the invention can be prepared by a process including the mixing, with agitation, of an aqueous silica suspension and, optionally, of water, with a solution of the said aluminium compound, the latter solution being at a temperature of between 15 and 130° C. In particular, this process includes the mixing, with mechanical agitation, of an aqueous suspension of precipitated silica and, optionally, of water, with a solution of aluminium sulphate (anhydrous or preferably hydrated) which is at a temperature of between 15 and 30° C. or, preferably, between 95 and 130° C. (especially of aluminium sulphate hydrate which is melted in its water of crystallization at this temperature), in particular between 100 and 120° C.

In the processes of preparation making use of an aqueous silica suspension, the latter may be optionally obtained by suspending in water, with agitation (especially mechanical agitation), a silica in solid form, in particular a precipitated silica $S_1$ to $S_5$.

After this stage of suspending in water, the suspension can be disintegrated mechanically. The mechanical disintegration (or deflocculation) may be performed in a disintegrator/blender. In general a chemical disintegration is carried out conjointly with this mechanical disintegration by introducing into the disintegrator/blender the sodium aluminate and, preferably and in general simultaneously, an acid (especially an inorganic acid such as sulphuric acid), so that the pH of the suspension remains between 6 and 7 and the Al/SiO$_2$ weight ratio is between 1000 and 3300 ppm. Once this addition has been carried out the mechanical disintegration may optionally be continued.

After the disintegration stage or the stage of suspending in water (if the disintegration stage is not used), a wet grinding or a disintegration of the suspension with ultrasound may be performed.

The wet grinding may be carried out by passing the suspension through a mill of the colloid mill type or a bead mill.

The disintegration with ultrasound may be performed by subjecting the suspension to ultrasonic waves (ultrasound treatment) by means of a high-power ultrasonic probe.

Nevertheless, the suspension according to the invention is very preferably prepared by a process using an aqueous suspension of precipitated silica which has been obtained by mechanical disintegration (especially in a disintegrator/blender) of a filter cake originating from a silica precipitation reaction in which reaction, in particular, a silicate of an alkali metal M is reacted with an acidifying agent.

The choice of the acidifying agent and of the silicate is made in a manner which is well known per se.

The acidifying agent generally employed is a strong inorganic acid such as sulphuric acid, nitric acid or hydrochloric acid, or an organic acid such as acetic acid, formic acid or carbonic acid.

The acidifying agent may be dilute or concentrated; its normality may be between 0.4 and 36 N, for example between 0.6 and 1.5 N.

In particular, in the case where this acidifying agent is sulphuric acid, its concentration is preferably between 40 and 180 g/l, for example between 60 and 130 g/l.

Furthermore, any common form of silicates may be employed as silicate, such as metasilicates, disilicates and advantageously an alkali metal M silicate in which M is sodium or potassium.

The alkali metal M silicate usually has a concentration (expressed as SiO$_2$) of between 40 and 330 g/l, for example between 60 and 300 g/l, in particular between 60 and 250 g/l.

In general, sulphuric acid is employed as acidifying agent and sodium silicate as silicate.

In the case where sodium silicate is employed, the latter generally exhibits an SiO$_2$/Na$_2$O weight ratio of between 2 and 4, more particularly between 3.0 and 3.7.

According to a first advantageous embodiment of the invention the filter cake is obtained by a process including:
(A) a reaction of silica precipitation by the action of an alkali metal M silicate with an acidifying agent, in the case of which:
 (i) an initial base stock is formed comprising at least a proportion of the total quantity of the alkali metal M silicate introduced into the reaction and an electrolyte, the silicate concentration (expressed as SiO$_2$) in the said initial base stock being lower than 100 g/l and the electrolyte concentration in the said initial base stock being lower than 17 g/l,
 (ii) the acidifying agent is added to the said base stock until a pH value of the reaction mixture of at least approximately 7 is obtained,
 (iii) acidifying agent is added to the reaction mixture, if appropriate simultaneously with the quantity of alkali metal M silicate,
(B) the filtration of the reaction mixture, so as to recover a filter cake which has a solids content of between 8 and 40% by weight.

A low silicate and electrolyte concentration in the initial base stock are important conditions in this case.

In this embodiment the operation is carried out as follows.

A base stock which includes silicate and an electrolyte is formed first of all. The quantity of silicate present in the base stock may be either equal to the total quantity introduced into the reaction or may represent only a proportion of this total quantity.

Insofar as the electrolyte is concerned, this term is here intended to be understood in its normal accepted sense, that is to say that it means any ionic or molecular substance which, when dissolved, decomposes or dissociates to form ions or charged particles.

In particular, a salt from the group of the salts of alkali and alkaline-earth metals is employed and preferably the salt of the metal M of the starting silicate and of the acidifying agent, for example sodium sulphate in the case of the reaction of a sodium silicate with sulphuric acid.

According to an essential characteristic of this embodiment the electrolyte concentration in the initial base stock is (higher than 0 g/l and) lower than 17 g/l, preferably lower than 14 g/l.

According to another essential characteristic of the said embodiment the silicate concentration in the initial base stock is (higher than 0 g of SiO$_2$ per litre and) lower than 100 g of SiO$_2$ per litre. This concentration is preferably lower than 80 g/l, especially lower than 70 g/l.

The second stage consists in adding the acidifying agent to the base stock of composition described above.

This addition, which entails a related drop in the pH of the reaction mixture is carried out until a value of at least approximately 7, generally of between 7 and 8, is reached.

Once this value is reached, and in the case of a starting base stock including only a proportion of the total quantity of the silicate introduced, a simultaneous addition of acidifying agent and of the remaining quantity of silicate is then advantageously carried out.

The actual precipitation reaction is finished when all the remaining quantity of silicate has been added.

At the end of the precipitation and especially after the precipitated simultaneous addition it is advantageous to perform an aging of the reaction mixture, it being possible for this aging to last, for example, from 5 minutes to 1 hour.

Finally, in all cases (that is to say both in the case of a starting base stock including only a proportion of the total quantity of the silicate introduced and in the case of a starting base stock including the total quantity of silicate introduced), it is possible to add an additional quantity of acidifying agent to the reaction mixture after the precipitation, in an optional subsequent stage. This addition is generally performed until a pH value of between 3 and 6.5, preferably between 4 and 6.5, is obtained.

The temperature of the reaction mixture is generally between 70 and 98° C.

According to an alternative form, the reaction is performed at a constant temperature of between 80 and 95° C. According to another alternative form the temperature at the end of reaction is higher than the temperature at the beginning of reaction; thus, the temperature at the beginning of the reaction is preferably maintained between 70 and 95° C.; the temperature is then increased over a few minutes preferably up to a value of between 80 to 98° C., at which it is maintained until the end of the reaction.

A reaction mixture consisting of a silica slurry is obtained at the end of the operations just described.

Stage (B) of this first advantageous embodiment of the invention then consists in filtering this silica slurry so as to recover a filter cake which has a solids content of between 8 and 40% by weight.

The filtration may be carried out by any suitable method, for example using a belt filter, a vacuum rotary filter or, preferably, using a filter press.

The cakes obtained by press filtration generally have fairly high solids contents.

It should be noted that the precipitated silica $S_1$ mentioned above in the description can be prepared by spray-drying the filter cake obtained (in particular when using a filter press), preferably by means of a multinozzle sprayer, it being additionally necessary for this cake to have, immediately before its drying, a solids content of at most 24% by weight (preferably at most 23% by weight) and higher than 18% by weight (preferably higher than 20% by weight), it being possible for the said cake to have been mechanically and, optionally, chemically disintegrated before the drying, as indicated elsewhere.

According to a second advantageous embodiment of the invention the filter cake is obtained by a process including:

(A) a reaction of silica precipitation by the action of an alkali metal M silicate with an acidifying agent, in the case of which:
  (i) an initial base stock is formed comprising a proportion of the total quantity of the alkali metal M silicate introduced into the reaction, the silicate concentration (expressed as $SiO_2$) in the said base stock being lower than 20 g/l,
  (ii) the acidifying agent is added to the said initial base stock until at least 5% of the quantity of $M_2O$ present in the said initial base stock is neutralized,
  (iii) acidifying agent and the remaining quantity of alkali metal M silicate are simultaneously added to the reaction mixture such that the ratio of added quantity of silicate (expressed as $SiO_2$)/quantity of silicate present in the initial base stock (expressed as $SiO_2$), called consolidation ratio, is higher than 4 and at most 100, (B) the filtration of the reaction mixture, so as to recover a filter cake which has a solids content of between 8 and 40% by weight.

A very low silicate concentration in the initial base stock and an appropriate consolidation ratio during the simultaneous addition stage are important conditions in this case.

In this embodiment the operation is carried out as follows.

A base stock which includes silicate is formed first of all. The quantity of silicate present in this initial base stock advantageously represents only a proportion of the total quantity of silicate introduced into the reaction.

According to an essential characteristic of this embodiment the silicate concentration in the initial base stock is (higher than 0 g of $SiO_2$ per litre and) lower than 20 g of $SiO_2$ per litre.

This concentration may be at most 11 g/l and, optionally, at most 8 g/l.

This concentration may be at least 8 g/l, in particular between 10 and 15 g/l, especially when the filtration performed subsequently is carried out by means of a filter press.

The initial base stock may include an electrolyte. Nevertheless, preferably, no electrolyte is employed in the course of this embodiment; in particular, the initial base stock preferably does not include any electrolyte.

The second stage consists in adding the acidifying agent to the base stock of composition described above.

Thus, in this second stage, the acidifying agent is added to the said initial base stock until at least 5%, preferably at least 50%, of the quantity of $M_2O$ present in the said initial base stock is neutralized.

In this second stage the acidifying agent is preferably added to the said initial base stock until 50 to 99% of the quantity of $M_2O$ present in the said initial base stock is neutralized.

Once the desired value of quantity of neutralized $M_2O$ is reached, a simultaneous addition (stage (iii)) of acidifying agent and of a quantity of alkali metal M silicate is then undertaken, such that the consolidation ratio, that is to say the ratio of added quantity of silicate (expressed as $SiO_2$)/ quantity of silicate present in the initial base stock (expressed as $SiO_2$) is higher than 4 and at most 100.

According to an alternative form this simultaneous addition of acidifying agent and of a quantity of alkali metal M silicate is undertaken, such that the consolidation ratio is more particularly between 12 and 100, preferably between 12 and 50, especially between 13 and 40.

According to another alternative form this simultaneous addition of acidifying agent and of a quantity of alkali metal M silicate is undertaken, such that the consolidation ratio is rather higher than 4 and lower than 12, preferably between 5 and 11.5, especially between 7.5 and 11. This alternative form is generally used when the silicate concentration in the initial base stock is at least 8 g/l, in particular between 10 and 15 g/l, for example between 11 and 15 g/l.

Throughout stage (iii) the added quantity of acidifying agent is preferably such that 80 to 99%, for example 85 to 97%, of the added quantity of $M_2O$ is neutralized.

In stage (iii) it is possible to undertake the simultaneous addition of acidifying agent and silicate at a first pH plateau of the reaction mixture, $pH_1$, and then at a second pH plateau of the reaction mixture, $pH_2$, such that $7<pH_2<pH_1<9$.

The actual precipitation reaction is finished when all the remaining quantity of silicate has been added.

It may be advantageous, especially after the abovementioned simultaneous addition, to perform an aging of the reaction mixture, it being possible for this aging to last, for example, from 1 to 60 minutes, in particular from 5 to 30 minutes.

Finally, it is desirable to add an additional quantity of acidifying agent to the reaction mixture after the precipitation, in a subsequent stage, especially before the optional aging. This addition is generally performed until a pH value of the reaction mixture of between 3 and 6.5, preferably between 4 and 5.5, is obtained. It allows, in particular, the whole quantity of $M_2O$ added during stage (iii) to be neutralized.

The acidifying agent during this addition is generally identical with that employed during stage (iii).

The temperature of the reaction mixture is usually between 60 and 98° C.

The addition of acidifying agent during stage (ii) is preferably performed in an initial base stock whose temperature is between 60 and 96° C.

According to an alternative form, the reaction is performed at a constant temperature of between 75 and 96° C. According to another alternative form the temperature at the end of reaction is higher than the temperature at the beginning of reaction: thus, the temperature at the beginning of the reaction is preferably maintained between 70 and 96° C. and the temperature is then increased during the reaction over a few minutes, preferably up to a value of between 80 and 98° C., at which value it is maintained until the end of the reaction.

A reaction mixture consisting of a silica slurry is obtained at the end of the operations just described.

Stage (B) of this second advantageous embodiment of the invention then consists in filtering this silica slurry so as to recover a filter cake which has a solids content of between 8 and 40% by weight.

While the filtration may be carried out by any suitable method (for example using a filter press, belt filter or vacuum rotary filter), it is advantageously performed using a filter press, for example when the silicate concentration in the initial base stock is at least 8 g/l (and lower than 20 g/l), in particular between 10 and 15 g/l, especially between 11 and 15 g/l.

The cakes obtained by press filtration generally have fairly high solids contents.

It should be noted that the precipitated silicas $S_2$ to $S_5$ mentioned above in the description can be prepared by spray-drying, preferably by means of a multinozzle sprayer (in general if it is desired to obtain them in the form of substantially spherical beads) or by means of a multiturbine sprayer (in general if it is desired to obtain them in powder form), the cake which is obtained (in general by press filtration, if it is desired to obtain them as substantially spherical beads, or by vacuum rotary filtration, if it is desired to obtain them in powder form); before the drying, this cake may have been disintegrated mechanically and, optionally, chemically, as indicated elsewhere.

When the cake to be dried has a solids content higher than 15% by weight the drying is preferably carried out by means of a multinozzle sprayer; when this content is at most 15% by weight the drying is preferably carried out by means of a multiturbine sprayer.

The precipitated silicas $S_2$ to $S_5$ can be obtained in the form of granules by subjecting the dried product (in particular starting with a cake which has a solids content of at most 15% by weight) to an agglomeration operation (especially direct compression, wet route granulation, extrusion or, preferably, dry compacting).

The suspensions according to the invention which are produced by the two advantageous embodiments described above generally exhibit the best properties.

If necessary, the filter cake may be washed with water, especially in the two advantageous embodiments of the invention, in particular to remove the alkali metal M salts formed during the precipitation reaction. For example, in the case where the precipitation involves sodium silicate and sulphuric acid, a cake which has an $Na_2SO_4$ content lower than 1.5% by weight can be isolated at the end of stage (B).

It should be noted that it is possible, optionally, to perform a thickening of the filter cake to increase its solids content to the desired value of between 8 and 40% by weight. The thickening consists in adding silica in solid form (pulverulent silica) in sufficient quantity to the said cake; in particular, this silica may be obtained by drying, especially by spray-drying, a proportion of the cake to be enriched. Pulverulent silica can also be obtained by performing a conventional drying of the cake after washing with organic solvents.

The suspension according to the invention is therefore preferably prepared by a process using an aqueous suspension of precipitated silica, this suspension having been obtained by mechanical disintegration of a silica filter cake, advantageously of a filter cake obtained in accordance with either of the embodiments described above.

A chemical disintegration may be carried out conjointly with this mechanical disintegration by introducing, for example into a disintegrator/blender, sodium aluminate and, preferably and in general simultaneously, an acid (especially an inorganic acid such as sulphuric acid), so that the pH of the suspension remains between 6 and 7 and the $Al/SiO_2$ weight ratio is between 1000 and 3300 ppm. The mechanical disintegration may optionally be continued once this addition has been carried out.

After the disintegration stage a wet grinding or a disintegration with ultrasound of the suspension may be advantageously performed.

The wet grinding and the ultrasonic disintegration may be carried out as indicated above in the description.

The suspension may be subjected to mechanical agitation before the disintegration with ultrasound.

The aqueous suspension of precipitated silica especially when prepared from a filter cake obtained in accordance with either of the advantageous embodiments described above and after the said wet grinding or the said disintegration with ultrasound, is, for example, such that its solids content is between 10 and 40% by weight, its viscosity, measured under a shear of 50 $s^{-1}$ for 1 minute, is lower than 0.04 Pa s, and in particular lower than 0.02 Pa s, and the quantity of silica present in the supernatant obtained after centrifuging the said suspension at 7500 rev/min for 30 minutes represents more than 50%, in particular more than 60%, especially more than 70% or even more than 90%, of the weight of the silica present in the suspension (a quantity measured after drying the supernatant at 160° C. until a constant weight of material is obtained).

Finally, another aqueous suspension of precipitated silica which can be employed in the processes for the preparation of the suspension according to the invention and exhibiting the characteristics just mentioned above can, optionally, be obtained by a process of conversion of the filter cake synthesized in either of the advantageous embodiments of the invention which are described above, a process by means of which:

(a) the said cake is washed with an organic solvent and the cake thus washed is dried to obtain a silica in pulverulent form, (b) a quantity of the said silica in pulverulent form is suspended in water, such that the solids content of the aqueous suspension of precipitated silica which is obtained is between 10 and 40% by weight.

Washing with organic solvents enables the water present in the pores of the cake to be displaced. The solvents used for this purpose are preferably polar solvents, especially ethanol and ether, which may be employed as a mixture.

In particular, it is possible to perform:

a first washing with ethanol, a second washing with a 50/50 ethanol/ether mixture, a third washing with ether.

Thus washed, the cake may be dried, for example in the ambient air. A free water content is obtained which is quite comparable with that obtained by spray-drying.

This type of drying can make it possible to prevent the collapse of porosity due to the action of capillarity forces during the drying.

A silica is thus obtained (in pulverulent form) which is very slightly agglomerated, with a porosity (measured by mercury porosimetry) which is very much higher than that obtained by the spray-drying techniques.

When it is resuspended in water in a quantity such that the solids content of the suspension is between 10 and 40% by weight, this silica generally produces aqueous suspensions of precipitated silica which are less viscous than those obtained by resuspending a silica obtained conventionally by spray-drying.

The presentation of the suspensions according to the invention in gel form, when they are left at rest, makes it possible to dispense with the problems of sedimentation or settling of the product, thus ensuring stability over several weeks or several months; these supensions then retain their homogeneity for at least such a period. Furthermore the gel formed is completely reversible under low shear: it is "broken" under low stress and is then converted into a homogeneous suspension of low viscosity which is easily pumpable.

The suspensions according to the invention can be employed especially:

for the preparation of paper pulps, especially as fillers or else as agents for retention of the fillers and fine fibres;

for water treatment;

as constituents of inorganic adhesives for paper, board and in building.

Furthermore, they find particularly advantageous applications in the field of materials of construction.

Accordingly, they can be employed for the preparation of cement mixes (grouts or slaked compositions formed from cement and water (and optionally other additives)), mortars and concretes.

In fact, in addition to their reversible gel presentation, they have the advantages of, preferably, improving the homogeneity, the cohesion and/or the adhesiveness (adhesive aspect) of these cement compositions.

In parallel, their long-term mechanical properties do not deteriorate; on the contrary, it is found that they produce high compressive strength values at 28 days (in general of at least 45 MPa in the case of mortars), especially when employed in a quantity such that the quantity by weight of silica which is employed (expressed as anhydrous silica) is between 0.5 and 5%, in particular between 0.5 and 2.5%, relative to the weight of cement and the quantity by weight of aluminium compound employed (expressed as anhydrous aluminium compound), for example of aluminium sulphate employed, is between 0.2 and 6%, in particular between 0.2 and 3%, relative to the weight of cement.

They are also advantageous for concreting in cold weather.

Furthermore, they also provide other remarkable advantages (in addition, in particular, to the good long-term mechanical properties) in the field of grouts, mortars and concretes which are sprayed (by means of the dry-route or, above all, wet-route spraying techniques, by addition at the spraying nozzle).

First of all, under low agitation they give rise to products that are completely pumpable by spraying machines which are conventionally employed.

The hygiene and safety conditions, especially for the operator using the spraying device, are improved as a result of the very weakly irritant nature of the suspension according to the invention.

The use of the suspensions according to the invention also permits a considerable decrease in the losses on spraying due to rebound and makes it possible to obtain very thick sprayed coats, resulting in a gain in output efficiency.

In the case where the quantity of aluminium compound which is employed, especially of aluminium sulphate (expressed as anhydrous product) is higher than 0.5%, preferably between 1.5 and 6%, relative to the weight of cement, a rapid hardening of the sprayed coat is preferably observed, making it possible to work in complete safety, for example under the vault, as soon as a few hours after the spraying (application to the production of structural mortars and concretes in particular).

In the case where the quantity of aluminium compound which is employed, especially of aluminium sulphate (expressed as anhydrous product) is at most 0.5% relative to the weight of cement, the thixotropic and formable nature of the cement composition is maintained for more than 0.5 hours after the spraying (application to the production of mortars and concretes that can be float-finished, in particular).

The suspensions according to the present invention can be also employed for the preparation of cement mixes (grouts or slaked compositions formed from cement and water (and optionally other additives)), mortars and concretes for the reinforcing of oil or gas wells.

For use in drilling, cement has to be injected between the tubes that line the well, and the inner surface of the hole so as to make this annular space impervious.

A mixture of cement and water, for example 400 to 500 liters of water for one ton of cement, having a volume corresponding to all or part of the annular space between the hole and the tube, is sent into the tubes and then driven back by mud into the annular space by means of pumps.

Depending upon the depth of setting of the cement, particular additives may be added to the cement to adjust its hydraulic and mechanical features, which are affected by the temperature and the pressure depending upon the depth.

In certain cases, particularly in areas which are near the bottom of the sea, where the temperature is near 4° C., the setting time of the mixture may be excessively long. It is then necessary to improve the homogeneity of the mixture while waiting for it to harden. In the case of high setting times, the use of the suspensions according to the present invention, which comprise a quantity of aluminium sulphate (expressed as an anhydrous product) of at least about 0.5%, preferably from about 1.5 to about 6%, by weight relative to the weight of the cement, leads to rapid setting of the mixture.

The use of the suspensions according to the present invention likewise leads to mixtures which under weak agitation are completely pumpable, which facilitates setting of the mixture in the annular space.

The following examples illustrate the invention without, however, limiting its scope.

EXAMPLE 1

A precipitated silica cake C1 is prepared as follows.

The following are introduced into a stainless-steel reactor fitted with a stirring system using propellers and with heating by means of a jacket:

346 litres of water 7.5 kg of $Na_2SO_4$ (electrolyte)

587 litres of aqueous sodium silicates exhibiting an $SiO_2/Na_2O$ weight ratio equal to 3.50 and a relative density at 20° C. of 1.133.

The silicate concentration (expressed as $SiO_2$) in the base stock is then 85 g/l. The mixture is heated to 79° C. while stirring is continued. 386 litres of dilute sulphuric acid with a relative density at 20° C. of 1.050 are then introduced into the mixture until a pH value equal to 8 (measured at the temperature of the mixture) is obtained. The temperature of the reaction mixture is 79° C. during the first 25 minutes and is then raised from 79° C. to 86° C. over 15 min, and then maintained at 86° C. until the end of the reaction.

Once the pH value equal to 8 is reached, 82 litres of aqueous sodium silicate with an $SiO_2/Na_2O$ weight ratio equal to 3.50 and a relative density at 20° C. equal to 1.133 and 131 litres of acid of the type described above are introduced together into the reaction mixture, this simultaneous introduction of acid and silicate being carried out so that the pH of the reaction mixture is continuously equal to 8±0.1. After all the silicate has been introduced the introduction of dilute acid is continued for 9 min so as to bring the pH of the reaction mixture to a value of 5.2. The introduction of acid is then stopped and the reaction slurry is kept stirred for an additional 5 min.

The total reaction period is 118 min.

A slurry of precipitated silica is obtained which is filtered and washed by means of a filter press so that finally a silica cake C1 is recovered whose loss on ignition is 78% (and hence a solids content of 22% by weight) and whose $Na_2SO_4$ content is 1% by weight.

EXAMPLE 2

4kg of cake C1 prepared in Example 1 (obtained by press filtration and exhibiting a solids content of 22% by weight and an $Na_2SO_4$ content of 1% by weight), heated beforehand to 60° C., are introduced into a Cellier disintegrator blender.

13.1 ml of a sodium aluminate solution (which has an $Al_2O_3$ content of 22% by weight and an $Na_2O$ content of 18% by weight (relative density: 1.505)) and 7.47 ml of a solution of sulphuric acid at a concentration of 80 g/l (relative density: 1.505) are then introduced simultaneously during the deflocculation of the cake, so as to maintain the pH at a value of 6.5.

The $Al/SiO_2$ weight ratio is approximately 2600 ppm.

Aging is allowed to take place for 20 minutes while the mechanical deflocculation is continued.

The silica suspension C2 which is obtained is characterized by:

a viscosity of 0.06 Pa s (measured under a shear of 50 $s^{-1}$ for 1 minute);

a particle size such that $d_{10}$=5 µm, $d_{50}$=19 µm, $d_{90}$=60 µm.

At the end of one week's storage the following are observed:

the formation, at the bottom of the storage container, of a deposit which is excessively difficult, or even impossible, to redisperse;

an increase in the viscosity of the suspension: its viscosity is then 0.45 Pa s (measured under a shear of 50 $s^{-1}$ for 1 minute).

EXAMPLE 3

1 kg of the suspension C2 prepared in Example 2 (sampled after the disintegration) exhibiting a solids content of 22% by weight, is placed in a receptacle fitted with a Rayneri single-bladed mechanical stirrer.

220 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C3 is obtained, exhibiting the following characteristics:

| | |
|---|---|
| pH | 3.25 |
| solids content (% by weight) | 28.4 |
| silica content (% by weight) (calculated as anhydrous silica) | 18.0 |
| aluminium sulphate content (% by weight) (calculated as anhydrous aluminium sulphate) | 10.4 |

In addition, after 2 hours at rest, the said suspension sets solid and is therefore in the form of a gel.

After one week's storage the gel is converted, by shearing at 500 $s^{-1}$ for 1 minute, into a homogeneous suspension exhibiting a viscosity ($V_r$), measured under a shear of 50 $s^{-1}$ for 1 minute, of 0.25 Pa s.

When left at rest, this suspension is converted back into gel after 2 hours.

After one month's storage this gel is converted, under gentle stirring (500 $s^{-1}$ for 1 minute) into a suspension exhibiting substantially the same characteristics as that obtained by "breaking" the gel after one week's storage.

EXAMPLE 4

1 kg of the suspension C2 prepared in Example 2 (sampled after the disintegration), exhibiting a solids content of 22% by weight, is placed in a receptacle fitted with a Rayneri single-bladed mechanical stirrer.

100 grams of water and 880 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C4 is obtained, exhibiting the following characteristics:

| | |
|---|---|
| pH | 2.6 |
| solids content (% by weight) | 36.7 |
| silica content (% by weight) (calculated as anhydrous silica) | 11.1 |
| aluminium sulphate content (% by weight) (calculated as anhydrous aluminium sulphate) | 25.6 |

In addition, after 24 hours at rest the said suspension sets solid and is therefore in the form of a gel.

This gel exhibits viscosities $V_1$, $V_2$ and $V_3$ (which are measured according to the procedure shown in the description) which are equal to 1.8 Pa s, 0.23 Pa s and 0.17 Pa s respectively.

After one week's storage the gel is converted, by shearing at 500 $s^{-1}$ for 1 minute, into a homogeneous suspension exhibiting a viscosity ($V_r$), measured under a shear of 50$s^{-1}$ for 1 minute, of 0.17 Pa s.

When left at rest, this suspension is converted back into gel after 24 hours.

After one month's storage this gel is converted, under gentle stirring (500 $s^{-1}$ for 1 minute) into a suspension exhibiting substantially the same characteristics as that obtained by "breaking" the gel after one week's storage.

EXAMPLE 5

1 kg of the suspension C2 prepared in Example 2 (sampled after the disintegration), exhibiting a solids content of 22% by weight, is homogenized by mechanical stirring in a receptacle fitted with a Rayneri single-bladed stirrer (500 rev/min for 5 minutes).

The disintegration of the suspension obtained is then performed by employing a Vibracell Bioblock sonic transducer (600 W) fitted with a probe of 19 mm diameter.

To do this, 250 ml of this suspension are introduced into a 400 ml beaker and the disintegration is then carried out as follows: with the probe immersed to a width of 4 cm, the output power is adjusted so as to obtain a power dial needle deflection indicating 40% (which corresponds to an energy dissipated by the tip of the probe of 240 watts/$cm^2$). The disintegration is performed for 15 minutes.

The suspension C5 obtained is characterized by:

a viscosity of 0.011 Pa s (measured under a shear of 50 s$^{-1}$ for 1 minute);

a particle size such that $d_{10}$=1.9 μm, $d_{50}$=5.6 μm, $d_{90}$=13 μm;

a solids content of 22% by weight.

EXAMPLE 6

1 kg of the suspension C5 prepared in Example 5, exhibiting a solids content of 22% by weight, is placed in a receptacle fitted with a Rayneri single-bladed mechanical stirrer.

220 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C6 is obtained, exhibiting the following characteristics:

| | |
|---|---|
| pH | 3.25 |
| solids content (% by weight) | 28.4 |
| silica content (% by weight) (calculated as anhydrous silica) | 18.0 |
| aluminium sulphate content (% by weight) (calculated as anhydrous aluminium sulphate) | 10.4 |

In addition, after 2 hours at rest the said suspension sets solid and is therefore in the form of a gel.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.045 Pa s.

When left at rest, this suspension is converted back into gel after 2 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 7

The chamber of a Netzch LME1 mill is fed with 2 litres of suspension C2 prepared in Example 2 (sampled after the disintegration), exhibiting a solids content of 22% by weight, at a rate of 0.083 litres/min; the filling ratio of the chamber with alumina beads (diameter: 0.6–1 mm) is 75% and the rate of rotation of the shaft is 2000 rev/min.

At the end of this wet grinding stage a suspension C7 is obtained, characterized by:

a viscosity of 0.016 Pa s (measured under a shear of 50 s$^{-1}$ for 1 minute);

a particle size such that $d_{10}$=1.13 μm, $d_{50}$=2.1 μm, $d_{90}$=5.4 μm;

a solids content of 22% by weight.

EXAMPLE 8

1 kg of the suspension C7 prepared in Example 7, exhibiting a solids content of 22% by weight, is placed in a receptacle fitted with a Rayneri single-bladed mechanical stirrer.

220 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C8 is obtained, exhibiting the following characteristics:

| | |
|---|---|
| pH | 3.25 |
| solids content (% by weight) | 28.4 |
| silica content (% by weight) (calculated as anhydrous silica) | 18.0 |
| aluminium sulphate content (% by weight) (calculated as anhydrous aluminium sulphate) | 10.4 |

In addition, after 2 hours at rest, the said suspension sets solid and is therefore in the form of a gel.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.08 Pa s.

When left at rest, the suspension is converted back into gel after 2 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 9

1 kg of the suspension C7 prepared in Example 7, exhibiting a solids content of 22% by weight, is placed in a receptacle fitted with a Rayneri single-bladed mechanical stirrer.

440 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C9 is obtained, exhibiting the following characteristics:

| | |
|---|---|
| pH | 3.05 |
| solids content (% by weight) | 32.9 |
| silica content (% by weight) (calculated as anhydrous silica) | 15.3 |
| aluminium sulphate content (% by weight) (calculated as anhydrous aluminium sulphate) | 17.6 |

In addition, after 24 hours at rest, the said suspension sets solid and is therefore in the form of a gel.

This gel exhibits viscosities $V_1$, $V_2$ and $V_3$ (which are measured according to the procedure shown in the description) equal to 7.27 Pa s, 0.20 Pa s and 0.075 Pa s respectively.

After one week's storage the gel is converted, by shearing at 500 s$^{-1}$ for 1 minute, into a homogeneous suspension exhibiting a viscosity ($V_r$), measured under a shear of 50 s$^{-1}$ for 1 minute, of 0.11 Pa s.

When left at rest, this suspension is converted back into gel after 24 hours.

After one month's storage this gel is converted, under gentle stirring (500 s$^{-1}$ for 1 minute) into a suspension exhibiting substantially the same characteristics as that obtained by "breaking" the gel after one week's storage.

EXAMPLE 10

1 kg of the suspension C7 prepared in Example 7, exhibiting a solids content of 22% by weight, is placed in a receptacle fitted with a Rayneri single-bladed mechanical stirrer.

100 grams of water and 880 grams of aluminium sulphate hydrate $Al_2(SO_4)_3 \cdot 14H_2O$ in powder form are added to it over 3 minutes with mechanical stirring (speed of rotation of the blade: 500 rev/min).

The stirring is continued for about fifteen minutes.

A homogeneous suspension C10 is obtained, exhibiting the following characteristics:

| | |
|---|---|
| pH | 2.6 |
| solids content (% by weight) | 36.7 |
| silica content (% by weight) (calculated as anhydrous silica) | 11.1 |
| aluminium sulphate content (% by weight) (calculated as anhydrous aluminium sulphate) | 25.6 |

In addition, after 24 hours at rest the said suspension sets solid and is therefore in the form of a gel.

This gel exhibits viscosities $V_1$, $V_2$ and $V_3$ (which are measured according to the procedure shown in the description) equal to 2.5 Pa s, 0.12 Pa s and 0.10 Pa s respectively.

After one week's storage the gel is converted, by shearing at 500 $s^{-1}$ for 1 minute, into a homogeneous suspension exhibiting a viscosity ($V_r$), measured under a shear of 50 $s^{-1}$ for 1 minute, of 0.11 Pa s.

When left at rest, this suspension is converted back into gel after 24 hours.

After one month's storage this gel is converted, under gentle stirring (500 $s^{-1}$ for 1 minute) into a suspension exhibiting substantially the same characteristics as that obtained by "breaking" the gel after one week's storage.

EXAMPLE 11

1 kg of the suspension C2 prepared in Example 2 (sampled after the disintegration), exhibiting a solids content of 22% by weight, and 100 grams of water are added to 880 grams of aluminium sulphate hydrate $Al_2(SO_4)_3 \cdot 14H_2O$ melted at 110° C. in its water of crystallization.

The addition is performed over about fifteen minutes.

A homogeneous suspension C11 is obtained, exhibiting the following characteristics:

| | |
|---|---|
| pH | 2.6 |
| solids content (% by weight) | 36.7 |
| silica content (% by weight) (calculated as anhydrous silica) | 11.1 |
| aluminium sulphate content (% by weight) (calculated as anhydrous aluminium sulphate) | 25.6 |

This suspension exhibits identical behaviour with suspension C4.

EXAMPLE 12

1 kg of the suspension C2 prepared in Example 2 (sampled after the disintegration), exhibiting a solids content of 22% by weight, and 240 grams of water are added to 1020 grams of aluminium sulphate hydrate $Al_2(SO_4)_3 \cdot 14H_2O$ melted at 110° C. in its water of crystallization.

The addition is performed over about fifteen minutes.

A homogeneous suspension C12 is obtained, exhibiting the following characteristics:

| | |
|---|---|
| pH | 2.4 |
| solids content (% by weight) | 35.8 |
| silica content (% by weight) (calculated as anhydrous silica) | 9.8 |
| aluminium sulphate content (% by weight) (calculated as anhydrous aluminium sulphate) | 26.0 |

In addition, after 24 hours at rest, the said suspension sets solid and is therefore in the form of a gel.

This gel exhibits viscosities $V_1$, $V_2$ and $V_3$ (which are measured according to the procedure shown in the description) equal to 1.0 Pa s, 0.12 Pa s and 0.09 Pa s respectively.

After one week's storage the gel is converted, by shearing at 500 $s^{-1}$ for 1 minute, into a homogeneous suspension exhibiting a viscosity ($V_r$), measured under a shear of 50 $s^{-1}$ for 1 minute, of 0.09 Pa s.

When left at rest, this suspension is converted back into gel after 24 hours.

After one month's storage this gel is converted, under gentle stirring (500 $s^{-1}$ for 1 minute) into a suspension exhibiting substantially the same characteristics as that obtained by "breaking" the gel after one week's storage.

What is claimed is:

1. An aqueous suspension of silica and an aluminum compound selected from the group consisting of aluminum sulphate, basic aluminum sulphates, alums, and their mixtures, said suspension having a pH lower than 3.5 and a solids content of between 10 and 50% by weight, wherein said suspension is free of surfactants and in that, after a period at rest of 48 hours, said suspension is in the form of a gel, said gel being reversible under low shear.

2. An aqueous suspension consisting essentially of silica and an aluminum compound, wherein the aluminum compound is selected from the group consisting of aluminum sulphate, basic aluminum sulphates, alums, and their mixtures and the silica is chosen from silica smokes, precipitated silicas and mixtures thereof, said precipitated silica being in the form of substantially spherical beads which have a BET specific area of between 140 and 200 $m^2/g$, a CTAB specific surface area of between 140 and 200 $m^2/g$, a pore distribution such that the pore volume consists of pores whose diameter is between 175 and 275 Å represents at least 50% of the pore volume consisting of pores of diameters smaller than or equal to 400 Å and a mean size of at least 80 $\mu$m, said suspension having a pH lower than 3.5 and a solids content of between 10 and 50% by weight wherein said suspension is free of surfactants and in that, after a period at rest of 48 hours, said suspension is in the form of a gel, said gel being reversible under low shear.

3. A suspension according to claim 2, wherein said suspension has a silica content (expressed as anhydrous silica) of between 1 and 49% by weight.

4. A suspension according to claim 2, characterized in that it has a silica content (expressed as anhydrous silica) of between 3 and 35% by weight.

5. A suspension according to claim 2, wherein said suspension has an aluminum compound content (expressed as anhydrous aluminum compound) of between 1 and 49% by weight.

6. A suspension according to claim 2, characterized in that it has an aluminum compound content (expressed as anhydrous aluminum compound) of between 3 and 40% by weight.

7. A suspension according to claim 2, wherein said aluminum compound is aluminum sulphate.

8. A suspension according to claim 2, wherein said silica is precipitated silica.

9. A suspension according to claim 2, wherein said precipitated silica has:
   a CTAB specific surface of between 140 and 240 m²/g,
   an ultrasonic disintegration factor ($F_D$) higher than 11 ml,
   a median diameter ($\phi_{50}$), after disintegration with ultrasound, smaller than 2.5 μm.

10. Suspension according to claim 2, characterized in that the said precipitated silica has:
    a CTAB specific surface of between 140 and 240 m²/g,
    a pore distribution such that the pore volume consisting of the pores whose diameter is between 175 and 275 Å represents less than 50% of the pore volume consisting of the pores of diameters smaller than or equal to 400 Å,
    an ultrasonic disintegration factor ($F_D$) higher than 5.5 ml,
    a median diameter ($\phi_{50}$), after disintegration with ultrasound, smaller than 5 μm.

11. Suspension according to claim 2, characterized in that the said precipitated silica has:
    a CTAB specific surface of between 140 and 240 m²/g,
    a median diameter ($\phi_{50}$), after disintegration with ultrasound, smaller than 2.8 μm.

12. Suspension according to claim 2, characterized in that the said precipitated silica has:
    a CTAB specific surface of between 140 and 240 m²/g,
    a pore distribution such that the pore volume consisting of the pores whose diameter is between 175 and 275 Å represents less than 55% of the pore volume consisting of the pores of diameters smaller than or equal to 400 Å,
    a median diameter ($\phi_{50}$), after disintegration with ultrasound, smaller than 4.5 μm.

13. A suspension according to claim 2 wherein said suspension is in the form of a gel after a period of rest of 24 hours, the said gel being reversible under low shear.

14. A suspension according to claim 2 wherein said suspension is in the form of a gel after a period of rest of 2 hours, the said gel being reversible under low shear.

15. A suspension according to claim 2 wherein said suspension is in the form of a gel after a period of rest of 24 hours and wherein said gel has a viscosity ($V_1$), measured under a shear of 1 s$^{-1}$ for one minute, higher than 0.6 Pa s.

16. A suspension according to claim 2, wherein the said gel is such that shearing at 500 s$^{-1}$ for 1 minute converts it into a suspension which has a viscosity ($V_r$), measured under a shear of 50 s$^{-1}$ for 1 minute, of at most 0.35 Pa s.

17. A suspension according to claim 2, wherein the said silica is finely divided.

18. A suspension according to claim 2, wherein the said silica has a particle size such that $d_{10}$ is between 4 and 10 μm, $d_{50}$ is between 15 and 30 μm, and $d_{90}$ is between 50 and 100 μm.

19. A suspension according to claim 2 wherein said suspension is in the form of a gel after a period of rest of 24 hours it is in the form of a gel, which has a viscosity ($V_1$), measured under a shear of 1 s$^{-1}$ for one minute, higher than 0.5 Pa s.

* * * * *